US012558771B2

(12) United States Patent
Gore

(10) Patent No.: US 12,558,771 B2
(45) Date of Patent: Feb. 24, 2026

(54) BIN TOPPER FOR PARTS BIN CABINET AND COMBINATION THEREOF

(71) Applicant: THE DURHAM MANUFACTURING COMPANY, Durham, CT (US)

(72) Inventor: Matthew Gore, Durham, CT (US)

(73) Assignee: THE DURHAM MANUFACTURING COMPANY, Durham, CT (US)

(*) Notice: Subject to any disclaimer, the term of this patent is extended or adjusted under 35 U.S.C. 154(b) by 0 days.

(21) Appl. No.: 18/625,989

(22) Filed: Apr. 3, 2024

(65) Prior Publication Data

US 2024/0335937 A1 Oct. 10, 2024

Related U.S. Application Data

(60) Provisional application No. 63/456,870, filed on Apr. 4, 2023.

(51) Int. Cl.

| | |
|---|---|
| ***B25H 3/04*** | (2006.01) |
| ***A47F 5/00*** | (2006.01) |
| *A47B 73/00* | (2006.01) |

(52) U.S. Cl.

CPC ............. *B25H 3/04* (2013.01); *A47F 5/0025* (2013.01); *A47B 73/00* (2013.01)

(58) Field of Classification Search

CPC .... B25H 3/04; B25H 3/06; B25H 3/00; A47B 73/00; A47F 3/14; A47F 5/0025

(Continued)

(56) References Cited

U.S. PATENT DOCUMENTS 1,188,146 A * 6/1916 Bogley .................. A47B 73/00 211/74
1,204,920 A * 11/1916 Williamson ............ A47F 5/112 211/72

(Continued)

FOREIGN PATENT DOCUMENTS

CN 204970247 U 1/2016
DE 2549554 A1 * 5/1977

(Continued)

OTHER PUBLICATIONS

International Search Report for International Application No. PCT/US2024/022763; Mailing Date, Jul. 23, 2024.

(Continued)

*Primary Examiner* — Stanton L Krycinski
(74) *Attorney, Agent, or Firm* — CANTOR COLBURN LLP

(57) ABSTRACT

A bin topper for a storage parts bin cabinet includes: a body having a sheet metal construct with at least three contiguously formed sides having a bottom support side, a front display side, and a back support side; wherein the front display side has a plurality of openings sized to receive and display one or more products; wherein an outside overall footprint of the bottom support side is sized to fit on a same-sized top surface of a storage parts bin cabinet; wherein a height, H, of the front display side relative to the bottom support side when the body is mounted on top surface of a storage parts bin is sized such that the one or more products disposed in the plurality of openings of the front display side are supported by either the bottom support side or the top of the storage parts bin cabinet, or both the bottom support side and the top of the storage parts bin cabinet and extend through a respective one of the plurality of openings.

11 Claims, 6 Drawing Sheets

(58) Field of Classification Search
USPC ........................................... 211/72, 73, 85.18
See application file for complete search history.

(56) References Cited

U.S. PATENT DOCUMENTS

| | | | | | |
|---|---|---|---|---|---|
| 1,713,758 | A * | 5/1929 | Horwath | B65D 73/0085 | 248/152 |
| 1,998,481 | A * | 4/1935 | Yoder | B65D 5/528 | 206/561 |
| 2,580,676 | A * | 1/1952 | Gross | A47B 73/00 | 211/75 |
| 2,805,777 | A * | 9/1957 | Larson | B25H 3/04 | 211/106.01 |
| 2,974,804 | A * | 3/1961 | Maro | B25H 3/04 | 248/220.31 |
| 3,023,891 | A * | 3/1962 | Sutter | B25H 3/04 | 206/427 |
| 3,263,820 | A * | 8/1966 | Mcfadden | A61M 5/008 | 211/70.1 |
| 3,268,087 | A * | 8/1966 | Kramer | B25H 3/04 | 211/119.004 |
| 3,298,531 | A * | 1/1967 | Wilcke | A47L 13/512 | 211/70.6 |
| 3,375,934 | A * | 4/1968 | Bates | B01L 9/06 | 211/74 |
| 3,379,315 | A * | 4/1968 | Broadwin | B01L 3/0217 | 422/933 |
| 3,462,020 | A * | 8/1969 | Hall | A47F 5/112 | 206/419 |
| 3,751,172 | A * | 8/1973 | Seitz | B01L 9/06 | 356/244 |
| 3,774,774 | A * | 11/1973 | Menkel | A47F 7/145 | 248/152 |
| D242,103 | S * | 11/1976 | Schultz et al. | D6/552 | |
| 4,068,760 | A * | 1/1978 | Johnson, Jr. | A45D 24/38 | 206/564 |
| 4,211,455 | A * | 7/1980 | Tedrow | B25H 3/02 | 312/902 |
| 4,365,720 | A * | 12/1982 | Kaneshiro | B25H 3/006 | 211/73 |
| 4,412,618 | A * | 11/1983 | La Conte | B25H 3/06 | 211/13.1 |
| 4,488,654 | A * | 12/1984 | Odsgard | B65D 71/46 | 229/932 |
| 4,538,861 | A * | 9/1985 | Hughes, Jr. | A47B 23/04 | 190/11 |
| D286,968 | S * | 12/1986 | Gecchelin | D7/614 | |
| 4,653,637 | A * | 3/1987 | Wallace | B25H 3/04 | 211/70.1 |
| 4,907,705 | A * | 3/1990 | Waldeck | A47F 7/0028 | 211/195 |
| 5,373,939 | A * | 12/1994 | Bloomgren | B65D 85/24 | 206/443 |
| 5,641,079 | A * | 6/1997 | Schmidt | A47F 5/0823 | 211/104 |
| 5,725,109 | A * | 3/1998 | Moulton | B01L 9/06 | 211/73 |
| 5,850,917 | A * | 12/1998 | Denton | A61M 5/3278 | 206/370 |
| 5,951,129 | A * | 9/1999 | Stein | B25H 3/00 | 312/328 |
| 6,095,057 | A * | 8/2000 | Corban | A47B 96/027 | 108/42 |
| 6,269,961 | B1 * | 8/2001 | Porcelli | A47F 5/112 | 211/73 |
| 6,488,346 | B2 * | 12/2002 | Chen | A47B 47/0075 | 312/263 |
| D469,926 | S * | 2/2003 | Petruccelli | D28/73 | |
| D487,170 | S * | 2/2004 | Petruccelli | D28/73 | |
| D509,691 | S * | 9/2005 | Doran | D6/571 | |
| D530,128 | S * | 10/2006 | Doran | D6/571 | |
| 7,204,374 | B2 * | 4/2007 | Marek | B25H 3/04 | 211/70.6 |
| 7,232,039 | B2 * | 6/2007 | Doran | B65D 71/50 | 211/74 |
| D552,796 | S * | 10/2007 | Petruccelli | D28/38 | |
| D562,591 | S * | 2/2008 | Raile | D6/682.2 | |
| 7,506,771 | B2 * | 3/2009 | Bianchini | A47B 73/00 | 211/75 |
| D597,370 | S * | 8/2009 | Watkins | D7/354 | |
| D602,724 | S * | 10/2009 | Liu | D6/567 | |
| D603,189 | S * | 11/2009 | Raile | D6/682.2 | |
| D621,182 | S * | 8/2010 | Farley | D6/682.2 | |
| 7,971,716 | B2 * | 7/2011 | Eaton | A45C 13/00 | 206/373 |
| 7,987,983 | B1 * | 8/2011 | Guitreau | A47F 7/0028 | 211/74 |
| 8,061,538 | B2 * | 11/2011 | Seldon | F16B 12/26 | 211/74 |
| 8,100,265 | B2 | 1/2012 | Farley | | |
| 8,157,337 | B2 * | 4/2012 | Manalang | B25H 3/06 | 280/47.35 |
| D663,971 | S * | 7/2012 | Raile | D6/682.1 | |
| 8,640,889 | B2 * | 2/2014 | Gasper | A47F 5/0823 | 211/74 |
| 8,967,400 | B1 * | 3/2015 | Mumford | A47F 3/14 | 211/128.1 |
| 9,101,167 | B2 * | 8/2015 | Fath | B65D 5/425 | |
| 9,178,342 | B2 * | 11/2015 | Rodenberg | H02G 3/0425 | |
| D749,428 | S * | 2/2016 | Fath | D9/737 | |
| D749,429 | S * | 2/2016 | Fath | D9/737 | |
| 9,604,356 | B2 * | 3/2017 | Golias, Jr. | B25H 3/00 | |
| 11,752,616 | B2 * | 9/2023 | Heath, Jr. | B25H 3/003 | 211/70.6 |
| D1,008,697 | S * | 12/2023 | Belokin | D6/553 | |
| 11,931,882 | B2 * | 3/2024 | Clapp | B25H 3/022 | |
| 2004/0256535 | A1 * | 12/2004 | Desch | B43M 99/00 | 248/460 |
| 2006/0102569 | A1 * | 5/2006 | Laga | A47F 5/0807 | 211/70.6 |
| 2007/0152415 | A1 * | 7/2007 | Gunter | B62B 3/10 | 280/47.35 |
| 2009/0314728 | A1 * | 12/2009 | Oshry | A45D 44/04 | 211/85.18 |

FOREIGN PATENT DOCUMENTS

| | | | | |
|---|---|---|---|---|
| FR | 79954 | E * | 2/1963 | |
| GB | 2492345 | A * | 1/2013 | A47B 73/00 |
| JP | H07213393 | A | 8/1995 | |
| JP | 2001137093 | A | 5/2001 | |
| JP | 3081160 | U | 8/2001 | |

OTHER PUBLICATIONS

Written Opinion for International Application No. PCT/US2024/022763; Mailing Date, Jul. 23, 2024.

International Preliminary Report on Patentability for International Application No. PCT/US2024/022763; Mailing date, Oct. 16, 2025, 6 pages.

* cited by examiner

BIN TOPPER FOR PARTS BIN CABINET AND COMBINATION THEREOF

CROSS REFERENCE TO RELATED APPLICATIONS

This application claims the benefit of U.S. Provisional Application Ser. No. 63/456,870, filed Apr. 4, 2023, which is incorporated herein by reference in its entirety.

BACKGROUND

Steel storage parts bin cabinets are well known in the art of storage bins. Examples of which can be found at Applicant's website www.durhammfg.com/product-category/industrial-storage/bins-open/. While existing storage parts bin cabinets may be suitable for their intended purpose, the art of storage parts bin cabinets would be enhanced by providing a bin topper as disclosed herein to further enhance the utility of storage parts bin cabinets.

BRIEF SUMMARY

An embodiment includes a bin topper for a storage parts bin cabinet as defined by the appended independent claim (s). Further advantageous modifications of the bin topper for a storage parts bin cabinet are defined by the appended dependent claims.

Disclosed is a bin topper for a storage parts bin cabinet, the bin topper including: a body having a sheet metal construct with at least three contiguously formed sides comprising a bottom support side, a front display side, and a back support side; wherein the front display side comprises a plurality of openings sized to receive and display one or more products; wherein an outside footprint of the bottom support side is sized to fit on a same-sized top surface of the storage parts bin cabinet; wherein a height, H, of the front display side relative to the bottom support side when the body is mounted on the top surface of a storage parts bin is sized such that the one or more products disposed in the plurality of openings of the front display side (1200) are supported by either the bottom support side or the top surface of the storage parts bin cabinet, or both the bottom support side of the bin topper and the top surface of the storage parts bin cabinet and extend through a respective one of the plurality of openings; wherein the bin topper is configured to enhance the utility of the storage parts bin cabinet by providing previously underutilized space for the secure display of products such as aerosol cans and the like.

Disclosed is a bin topper for a storage parts bin cabinet, the bin topper including: a body having a sheet metal construct with at least three contiguously formed sides comprising a bottom support side, a front display side, and a back support side; wherein the front display side comprises a plurality of openings sized to receive and display one or more products; wherein an outside footprint of the bottom support side is sized to fit on a same-sized top surface of the storage parts bin cabinet; wherein a height, H, of the front display side relative to the bottom support side when the body is mounted on top surface of a storage parts bin is sized such that the one or more products disposed in the plurality of openings of the front display side are supported by either the bottom support side or the top surface of the storage parts bin cabinet, or both the bottom support side of the bin topper and the top surface of the storage parts bin cabinet and extend through a respective one of the plurality of openings.

In addition to one or more of the features described above, or as an alternative to any of the foregoing embodiments, the bottom support side includes at least two threaded openings disposed and configured to receive corresponding ones of threaded fasteners.

In addition to one or more of the features described above, or as an alternative to any of the foregoing embodiments, the corresponding ones of the threaded fasteners are removably disposed within respective ones of the at least two threaded openings.

In addition to one or more of the features described above, or as an alternative to any of the foregoing embodiments, each of the at least two threaded openings comprise a drawn and tapped threaded hole, or a threaded press-fit insert.

In addition to one or more of the features described above, or as an alternative to any of the foregoing embodiments, the plurality of openings in the front display side are circular, as observed in the plane of the front display side.

In addition to one or more of the features described above, or as an alternative to any of the foregoing embodiments, the plurality of openings in the front display side are elliptical and non-circular, as observed in the plane of the front display side.

In addition to one or more of the features described above, or as an alternative to any of the foregoing embodiments, wherein the sheet metal construct of the body forms side openings, the bin topper further comprising; first and second side panels sized, shaped, and non-removably fixedly attached to the body, that substantially close off the side openings.

In addition to one or more of the features described above, or as an alternative to any of the foregoing embodiments, the first and second side panels are fixedly attached to the body via rivets, welds, or metallurgically bonds.

In addition to one or more of the features described above, or as an alternative to any of the foregoing embodiments, the plurality of openings in the front display side includes at least two rows of openings; and the plurality of openings in the front display side are all equally sized with respect to each other.

In addition to one or more of the features described above, or as an alternative to any of the foregoing embodiments, the plurality of openings in the front display side comprises at least two rows of openings where the respective openings in each row are in horizontal linear alignment with each other; and the at least two rows of openings includes a first row of openings, and a second row of openings that are sideways offset from the first row of openings, as viewed from a front elevation view of the bin topper, such that individual openings of the second row of openings are not in vertical alignment with respective individual openings of the first row of openings.

In addition to one or more of the features described above, or as an alternative to any of the foregoing embodiments, the body is formed from a roll of sheet metal having a uniform width W that is cut to provide a rectangular piece of sheet metal having a plurality of bends; the body with the plurality of bends is in the form of a triangle as observed in a side end view of the body; the bottom support side comprises a first flange and a second flange disposed in a same horizontal plane, with a gap between the first and second flanges; the front display side is integrally formed with the first flange across a first bend; the back support side is integrally formed with the front display side across a second bend; the second flange is integrally formed with the back support side across a third bend; the front display side is planar.

In addition to one or more of the features described above, or as an alternative to any of the foregoing embodiments, a fourth side integrally formed with and disposed between the bottom support side and the front display side.

In addition to one or more of the features described above, or as an alternative to any of the foregoing embodiments, at least two openings disposed in the front display side, and at least two sets of openings disposed in the bottom support side, wherein each of the at least two openings is disposed in vertical alignment with a respective set of the at least two sets of openings, such that installation of the bin topper onto a top surface of a storage parts bin cabinet is accomplished by aligning the at least two sets of openings with at least two holes in the top surface of the storage parts bin cabinet, and performing a top-down installation procedure of fastener hardware through the at least two openings and respective sets of the at least two sets of openings, and into respective ones of the at least two holes, thereby securing the bin topper to the storage parts bin cabinet for enhanced display functionality.

Also disclosed is a combination storage parts bin cabinet and bin topper, the combination including: a storage parts bin cabinet having at least a top surface; and a bin topper of any one of or more of the features described above, or as an alternative to any of the foregoing embodiments disposed on and supported by the top surface of the storage parts bin cabinet.

In addition to one or more of the features described above, or as an alternative to any of the foregoing embodiments, the top surface of the storage parts bin cabinet comprises at least two holes disposed in one-to-one alignment with corresponding ones of the at least two threaded openings of the bottom support side of the bin topper.

In addition to one or more of the features described above, or as an alternative to any of the foregoing embodiments, the bin topper is removably attachable to the storage parts bin cabinet via the at least two holes of the storage parts bin cabinet and the at least two threaded openings of the bottom support side of the bin topper via corresponding ones of the threaded fasteners.

In addition to one or more of the features described above, or as an alternative to any of the foregoing embodiments, the storage parts bin cabinet comprises a plurality of individual storage parts bins arranged in an x-by-y array as viewed from a front elevation view of the combination.

In addition to one or more of the features described above, or as an alternative to any of the foregoing embodiments, the bin topper is fixedly attached to the top surface of the storage parts bin cabinet.

In addition to one or more of the features described above, or as an alternative to any of the foregoing embodiments, the bin topper is fixedly attached to the top surface of the storage parts bin cabinet via at least one mechanical fastener.

In addition to one or more of the features described above, or as an alternative to any of the foregoing embodiments, the bin topper is fixedly attached to the top surface of the storage parts bin cabinet via at least one metallurgical fastener or weld joint.

An embodiment includes a combination storage parts bin cabinet and bin topper, the combination including: a storage parts bin cabinet having at least the top surface; and, a bin topper as noted herein above disposed on and supported by the top surface of the storage parts bin cabinet.

The above features and advantages and other features and advantages of the invention are readily apparent from the following detailed description of the invention when taken in connection with the accompanying drawings.

DETAILED DESCRIPTION

As used herein, the phrase “embodiment” means “embodiment disclosed and/or illustrated herein”, which may not necessarily encompass a specific embodiment of an invention in accordance with the appended claims, but nonetheless is provided herein as being useful for a complete understanding of an invention in accordance with the appended claims.

Although the following detailed description contains many specifics for the purposes of illustration, anyone of ordinary skill in the art will appreciate that many variations and alterations to the following details are within the scope of the appended claims. For example, where described features may not be mutually exclusive of and with respect to other described features, such combinations of non-mutually exclusive features are considered to be inherently disclosed herein. Additionally, common features may be commonly illustrated in the various figures but may not be specifically enumerated in all figures for simplicity, but would be recognized by one skilled in the art as being an explicitly disclosed feature even though it may not be enumerated in a particular figure. Accordingly, the following example embodiments are set forth without any loss of generality to, and without imposing limitations upon, the claimed invention disclosed herein.

An embodiment, as shown and described by the various figures and accompanying text, provides a bin topper (1000) for securement on a top surface (2010) of a storage parts bin cabinet (2000), wherein the bin topper (1000) is configured to enhance the utility of the storage parts bin cabinet (2000) by providing previously underutilized space on the top surface (2010) of the storage parts bin cabinet (2000) for the secure display of products (3000) such as cylindrical aerosol cans and the like.

Figure 1:
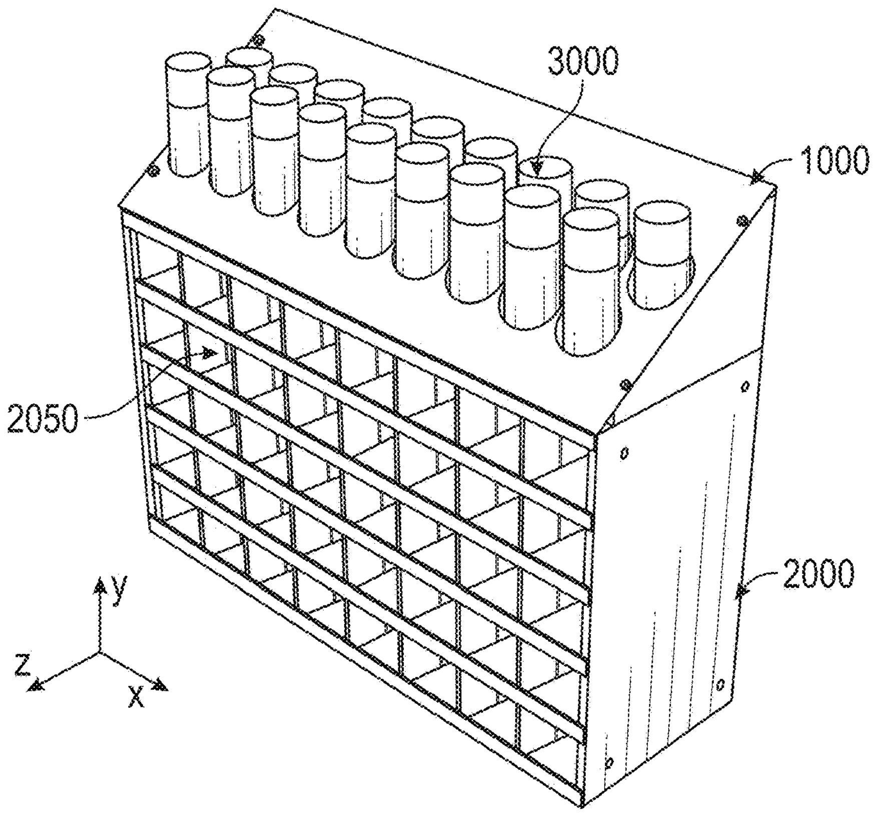
FIG. 1 depicts a rotated isometric front and side view of an example combination of a storage parts bin cabinet with a bin topper securely disposed thereon, in accordance with an embodiment.
Figure 2:
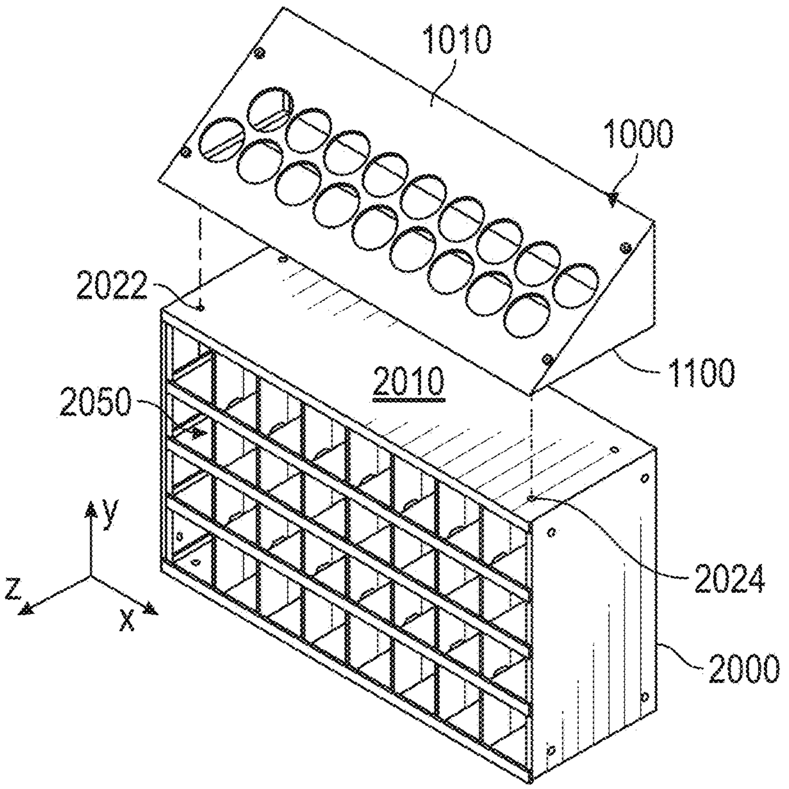
FIG. 2 depicts a rotated isometric front and side view of a disassembled assembly of a storage parts bin cabinet with a bin topper similar to that of FIG. 1, in accordance with an embodiment.

While embodiments described and or illustrated herein depict a storage parts bin cabinet (2000) having a defined number of storage parts bins (2050) arranged in an x-by-y array, such as an 8×5 array in FIG. 1, and an 8×4 array in FIG. 2, it will be appreciated that the disclosed invention is not so limited, and also encompasses other storage parts bin cabinets (2000) have a different array size of storage parts bins (2050).

Reference is now made to FIGS. 1 and 2, which respectively depict: a rotated isometric front and side view of an example combination of a storage parts bin cabinet (2000) with a bin topper (1000) securely disposed thereon, with a plurality of product (3000) on display and removably held by the bin topper (1000); and, a rotated isometric front and side view of a disassembled assembly of a storage parts bin cabinet (2000) with a bin topper (1000) similar to the combination depicted in FIG. 1. As can be seen, the storage parts bin cabinet (2000) depicted in FIG. 1 has a plurality of individual storage parts bins (2050) arranged in an 8×5 x-by-y array as viewed from a front elevation view (x-y plane) of the combination, and the storage parts bin cabinet (2000) depicted in FIG. 2 has a plurality of individual storage parts bins (2050) arranged in an 8×4 x-by-y array as viewed from a front elevation view of the combination. In view of the foregoing, it will be appreciated that a scope of the invention disclosed herein by the appended claims is not limited to a specific x-by-y array of storage parts bins (2050), but encompasses any x-by-y array of storage parts bins (2050) that fall within an ambit of the appended claims.

Reference is now made to FIGS. 3A-3D in combination with FIGS. 1-2.

In an embodiment, a bin topper (1000) for a storage parts bin cabinet (2000) includes a body (1010) having a sheet metal construct with at least three contiguously formed sides (1100, 1200, 1300) that comprise a bottom support side (1100), a front display side (1200), and a back support side (1300). As depicted, the front display side (1200) includes a plurality of openings (1210) sized to receive and display one or more products (3000), which in an embodiment is an aerosol can, but is not so limited, and in an embodiment may be any product suitable for a purpose disclosed herein. In an embodiment, an outside footprint (1110) of the bottom support side (1100) is sized to fit on a same-sized top surface (2010) of the storage parts bin cabinet (2000), and a height, H, of the front display side (1200) relative to the bottom support side (1100), when the body (1010) is mounted on top surface (2010) of a storage parts bin (2000), is sized such that the one or more products (3000) disposed in the plurality of openings (1210) of the front display side (1200) are visible for display and are supported by either the bottom support side (1100) or the top surface (2010) of the storage parts bin cabinet (2000), or both the bottom support side (1100) of the bin topper (1000) and the top surface (2010) of the storage parts bin cabinet (2000), and extend through a respective one of the plurality of openings (1210).

Figure 3A:
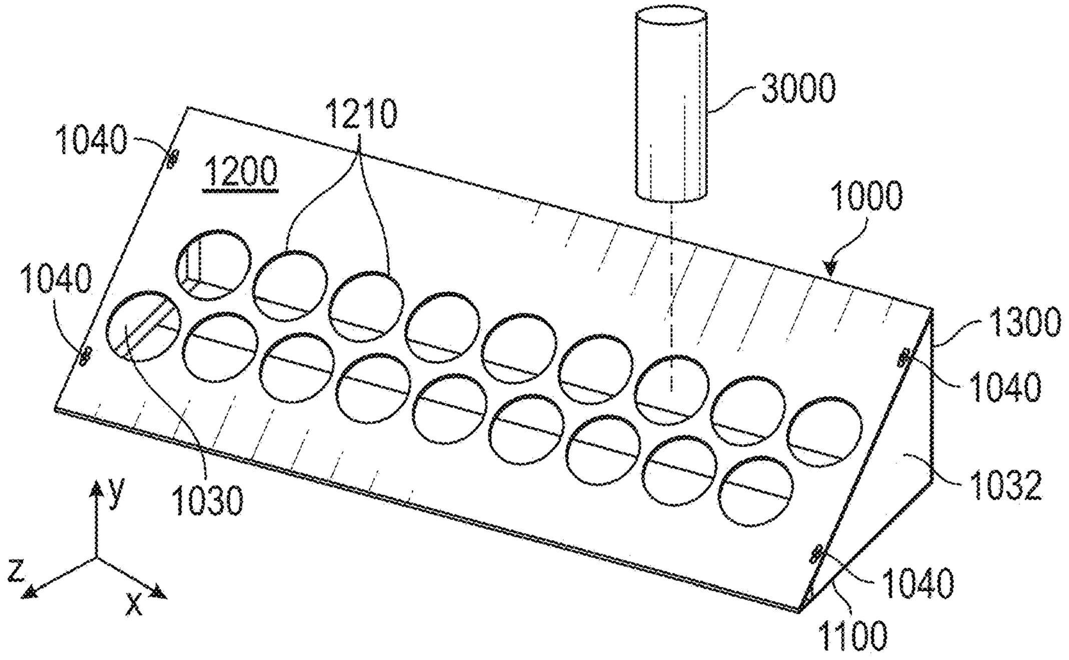
FIG. 3A depicts a rotated isometric front and side view of a bin topper similar to that of FIGS. 1 and 2, with side panels installed, and further depicting a disassembled product for display therein, in accordance with an embodiment.
Figure 3B:
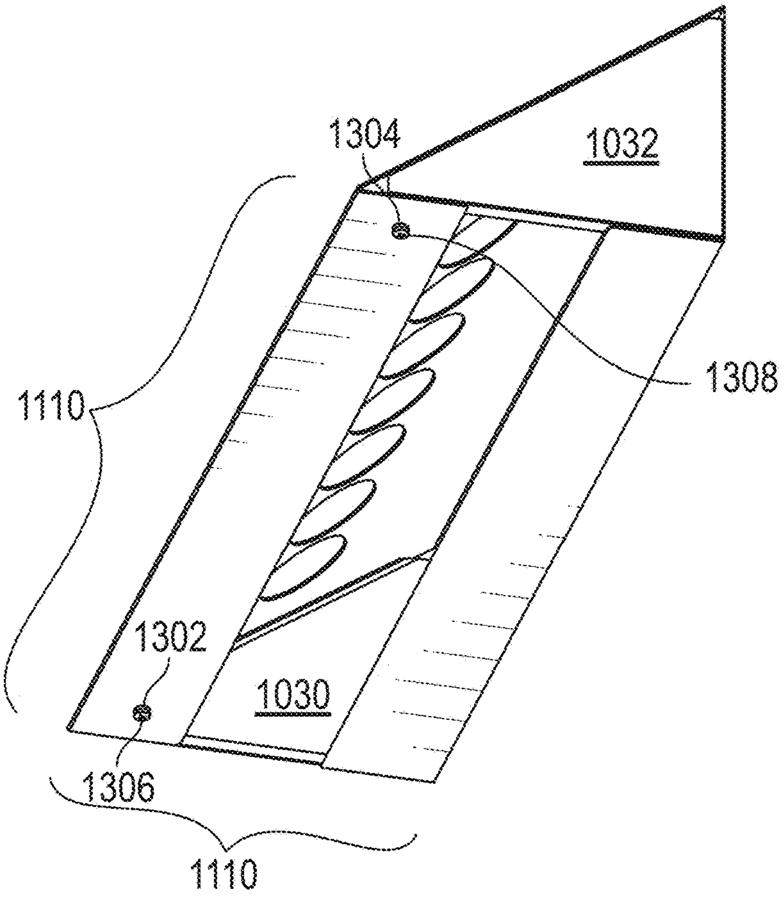
FIG. 3B depicts a rotated isometric bottom and side view of the bin topper of FIG. 3A, in accordance with an embodiment.
Figure 3C:
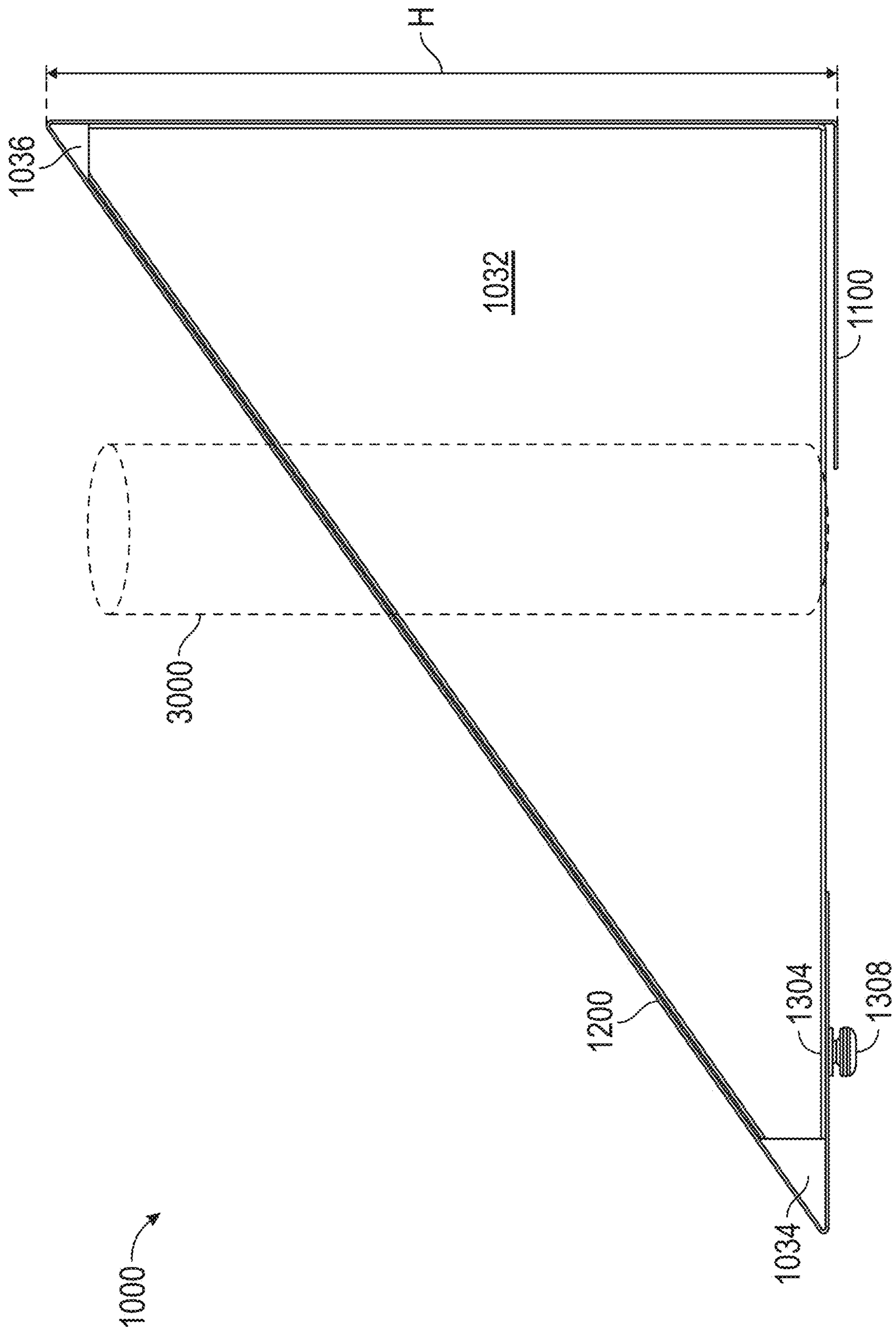
FIG. 3C depicts a right side elevation view of the bin topper of FIGS. 3A-3B, with a product for display therein depicted in phantom, in accordance with an embodiment.
Figure 3D:
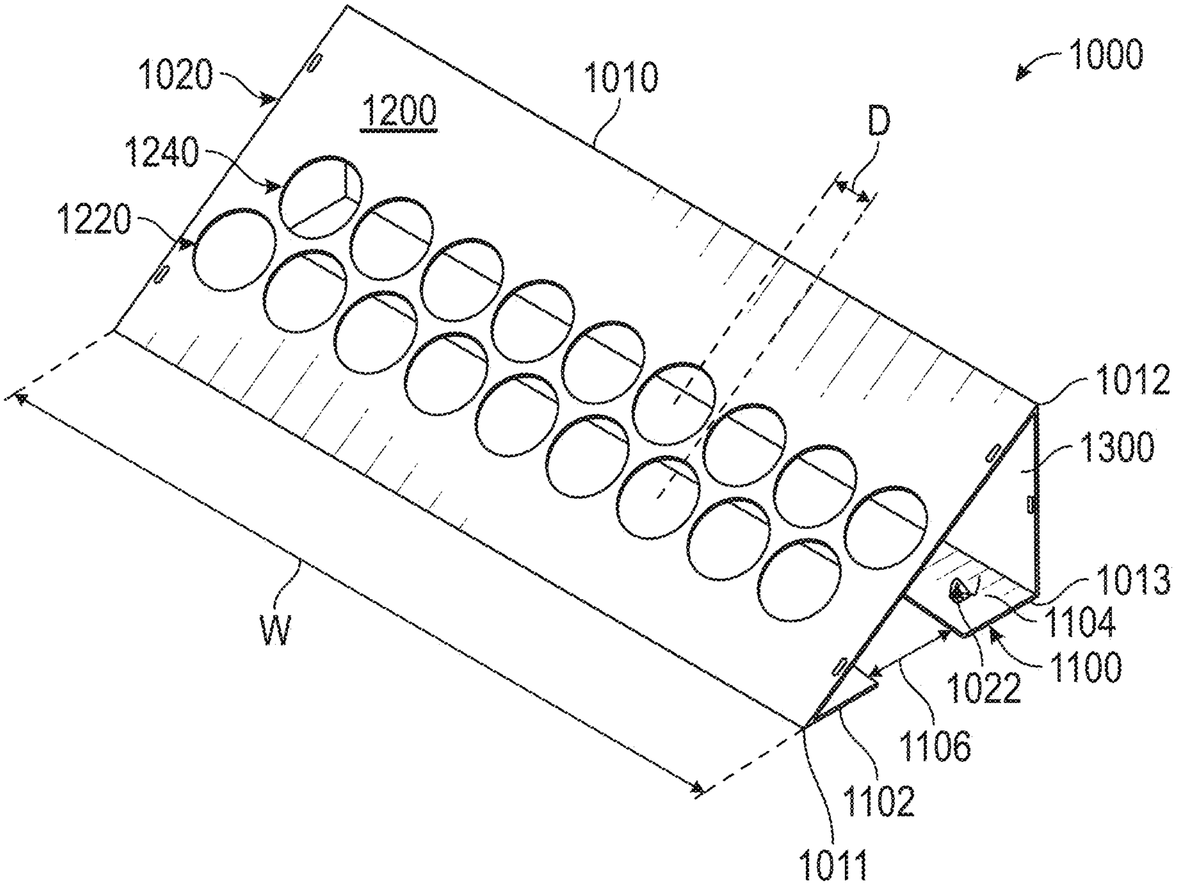
FIG. 3D depicts a rotated isometric front and side view of the bin topper of FIGS. 3A-3C, with the side panels not installed, in accordance with an embodiment.

As best seen with reference to FIGS. 3B-3C, an embodiment of the bottom support side (1100) of the bin topper (1000) has at least two threaded openings (1302, 1304) disposed and configured to receive corresponding ones of mechanical threaded fasteners (1306, 1308). In an embodiment, the threaded fasteners (1306, 1308) are pre-installed in the threaded openings (1302, 1304) ready for post-sale assembly of the bin topper (1000) on the top surface (2010) of the storage parts bin cabinet (2000), which has prefabricated holes (2022, 2024) (best seen with reference to FIG. 2) aligned to receive the threaded fasteners (1306, 1308). In an embodiment, the installation of the bin topper (1000) to the top surface (2010) of the storage parts bin cabinet (2000) involves removing the pre-installed threaded fasteners (1306, 1308) from the bin topper (1000), assembling the bin topper (1000) on the top surface (2010) of the storage parts bin cabinet (2000), aligning the threaded openings (1302, 1304) of the bin topper (1000) with the pre-fabricated holes (2022, 2024) of the storage parts bin cabinet (2000), and re-installing the threaded fasteners (1306, 1308) from within the storage parts bin cabinet (2000) upwards through the top surface (2010) of the storage parts bin cabinet (2000) and into the threaded openings (1302, 1304) of the bin topper (1000). From the foregoing installation procedure, it will be appreciated that the corresponding ones of the threaded fasteners (1306, 1308) are removably disposed within respective ones of the at least two threaded openings (1302, 1304). In an embodiment, each of the at least two threaded openings (1302, 1304) comprise a drawn and tapped threaded hole, or a threaded press-fit insert, also herein referred to by reference numerals 1302 and 1304.

Figure 4:
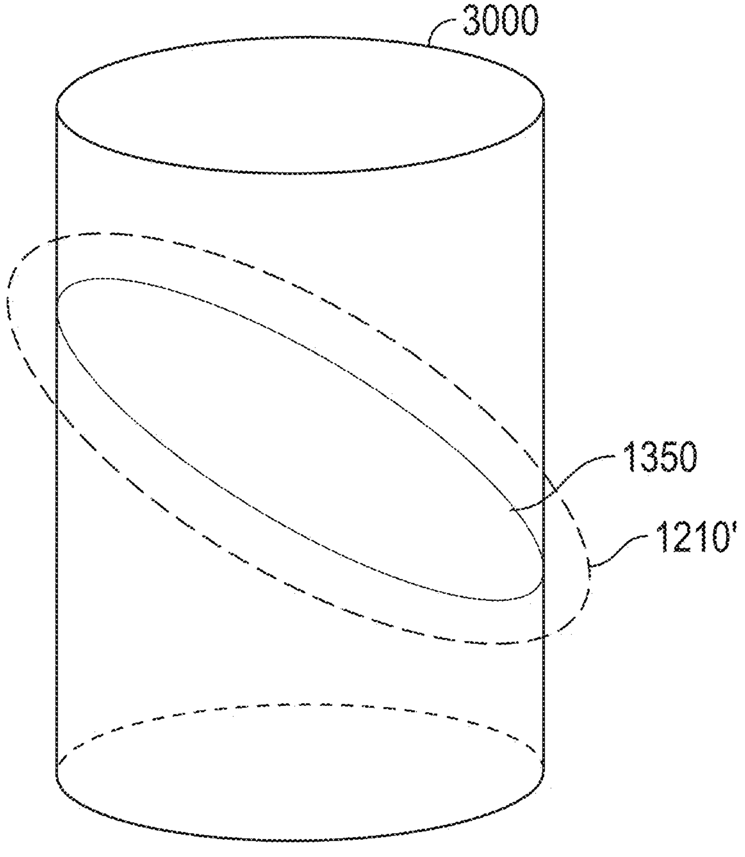
FIG. 4 depicts a rotated isometric partial view of an elliptical opening, depicted in dashed line format, in a front display side of a bin topper (not shown) with a displayable product disposed therein for use in a bin topper as disclosed herein, in accordance with an embodiment.

In an embodiment, the plurality of openings (1210) in the front display side (1200) are circular, as observed in the plane of the front display side (1200). However, in another embodiment, which provides a more tailored top-down fit of the cylindrical displayable products (3000) due to the angled surface of the front display side (1200), the plurality of openings (1210) in the front display side (1200) are elliptical and non-circular, see FIG. 4 for example, which depicts an elliptical opening (1210') depicted in dashed line format (in the front display side 1200 of the bin topper 1000, not shown in FIG. 4 but shown in other Figures presented herein) that mimics and is larger than the elliptical profile of an angled section cut (3050) through a cylindrical displayable product (3000), as observed in the plane of the front display side (1200), where the major axis of each elliptical opening (1210') is in a plane parallel to the y-z-plane (axis orientation best seen with reference to FIG. 3A).

In an embodiment, the sheet metal construct of the body (1010) forms side openings (1020, 1022) (best seen with reference to FIG. 3D), and the bin topper further comprises first and second side panels (1030, 1032) (best seen with reference to FIGS. 3A-3C) sized, shaped, and fixedly attached to the body (1010), that substantially close off the side openings (1020, 1022). In an embodiment, the first and second side panels (1030, 1032) are fixedly attached to the body (1010) via rivets, welds, or metallurgically bonds (1040) (best seen with reference to FIG. 3A).

As used herein, the term substantially is intended to account for manufacturing tolerances and tooling considerations, such as the absence of material in otherwise sharp corner profiles for example, which can be seen by the absence of material (1034, 1036) in the otherwise sharp corner profiles of side panels (1030, 1032) (best see with reference to FIG. 3C).

In an embodiment, the body (1010) is formed from a roll of sheet metal having a uniform width W (see FIG. 3D) that is cut to provide a rectangular piece of sheet metal that is then formed to have a plurality of bends (1011, 1012, 1013), wherein the body (1010) with the plurality of bends (1011, 1012, 1013) is formed in the shape of a triangle as observed in a side end view of the body (1010). In an embodiment, and as further depicted in FIG. 3D, the body (1010) has a bottom support side (1100) comprising a first flange (1102) and a second flange (1104) disposed in a same horizontal plane, with a gap (1106) between the first and second flanges (1102, 1104). The triangular formed body (1010) is configured such that the front display side (1200) is integrally formed with the first flange (1102) across a first bend (1011), the back support side (1300) is integrally formed with the front display side (1200) across a second bend (1012), and the second flange (1104) is integrally formed with the back support side (1300) across a third bend (1013). In an embodiment, the front display side (1200) is planar. In an embodiment, the plurality of openings (1210) in the front display side (1200) comprises at least two rows of openings (1220, 1240) that are equally sized with respect to each other, and where the respective openings (1210) in each row (1220, 1240) are in horizontal linear alignment with each other. In an embodiment, the at least two rows of openings (1220, 1240) comprises a first row of openings (1220) and a second row of openings (1240) that are sideways offset a dimension D from the first row of openings (1220), as viewed from a front elevation view of the bin topper (1000), such that individual openings of the second row of openings (1240) are not in vertical alignment with respective individual openings of the first row of openings (1220). In an embodiment, the at least two threaded openings (1302, 1304) and the corresponding threaded fasteners (1306, 1308) are disposed proximate the first bend (1011).

As used herein, the phrase integrally formed means a structure formed with material common to the rest of the structure absent material discontinuities from one region of the structure to another, such as a structure produced from a plastic molding process, or a metal-working fabrication process, for example. Alternatively, integrally formed means a unitary one-piece indivisible structure.

Figure 3E:
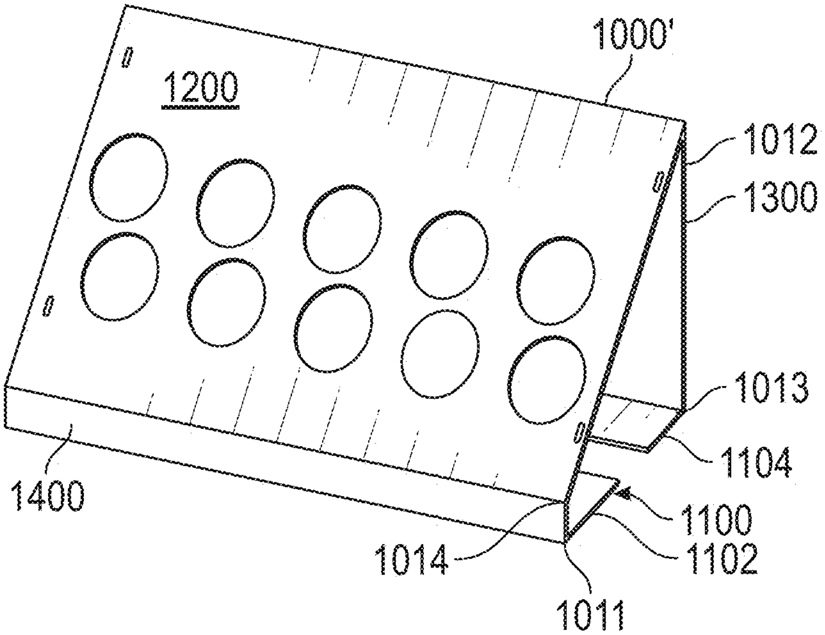
FIG. 3E depicts a rotated isometric front and side view of an alternative bin topper to that of FIGS. 3A-3D, with no side panels installed, in accordance with an embodiment.

While an embodiment of the bin topper (1000) is disclosed herein having a three-sided triangular side profile (FIGS. 3A-3D for example), it will be appreciated that alternative tooling to produce alternative shapes is possible and contemplated, such as a four-sided quadrilateral side profile as shown in FIG. 3E for example. Here, like features are numbered alike as compared to FIGS. 3A-3D, with a fourth side (1400) and a fourth bend (1014) being illustrated. As depicted in FIG. 3E, the fourth side (1400) is integrally formed with and disposed between the bottom support side (1100) and the front display side (1200). As further depicted in FIG. 3E, a four-sided bin topper (1000') includes the first flange (1102) integrally connected with the fourth side (1400) across the first bend (1011), the fourth side (1400) integrally connected with the front display side (1200) across the fourth bend (1014), the front display side (1200) integrally connected with the back support side (1300) across the second bend (1012), and the back support side (1300) integrally connected with the second flange (1104) across the third bend (1013). In an embodiment, the four-sided bin topper (1000') has additional utility to that of the three-sided bin topper (1000) by way of the fourth side (1400) providing a label display surface (also referred to by reference numeral 1400) for product advertising or other product information display for example.

While an embodiment of the bin topper (1000) is disclosed herein having a planar front display side (1200), it will be appreciated that a scope of an invention defined by the appended claims is not so limited, which may also encompass a non-planar front display side (1200), which may be concave, convex, wavy, or any other surface shape, while still being suitable for the intended purpose disclosed herein. Any and all such planar and non-planar surfaces for the front display side (1200), or for the back support side (1300), or for the fourth label display surface (1400), are contemplated and considered to be inherently if not literally disclosed herein.

While an embodiment of the bin topper (1000) is disclosed herein having a plurality of openings (1210) in the form of a first row of openings (1220), and a second row of openings (1240), it will be appreciated that another embodiment may include just one row of openings, or more than two rows of openings, which may depend on the size of the storage parts bin top (2010), or the size of the product (3000) to be displayed, for example. Any and all arrangements for the plurality of openings (1210) are contemplated.

While an embodiment of the bin topper (1000) is disclosed herein having circular or elliptical openings (1210, 1210') for display of a cylindrical product (3000), it will be appreciated that other products having a non-cylindrical shape may be desired for display, such as a rectangular box for example. As such, it is contemplated that other non-cylindrical and non-elliptical openings may be employed without detracting from a scope of the invention encompassed by the appended claims.

While an embodiment of the bin topper (1000) is disclosed herein having a plurality of openings (1210) that are illustrated being equally sized and having the same shape, it will be appreciated that a scope of the invention in the appended claims is not so limited, and can include openings (1210) of different sizes and different shapes.

While an embodiment of the bin topper (1000) is disclosed herein having the front display side (1200) with two rows of openings (1220, 1240) where the respective openings (1210) in each row (1220, 1240) are in horizontal linear alignment with each other, it will be appreciated that a scope of the invention in the appended claims is not so limited, and can include respective openings (1210) in each row (1220, 1240) that are not in horizontal linear alignment with each other.

While an embodiment of the bin topper (1000) is disclosed herein having a certain number of openings (1210) in a given number of rows of openings (1220, 1240), it will be appreciated that a scope of the invention in the appended claims is not so limited, and can encompass any number of openings (1210) suitable for a purpose disclosed herein. For example, FIGS. 1, 2, 3A, and 3D, depict two rows of nine openings each, and FIG. 3E depicts two rows of five openings each. However, it will be appreciated that the number of openings may vary, the number of rows of openings may vary, and the number of openings in each row may vary (one row may have an even number of openings, and another row may have an odd number of openings, for example). Any and all such number of openings, rows of openings, and combinations of numbers of openings in any row, is contemplated and considered to be inherently if not literally disclosed herein.

Figure 5A:
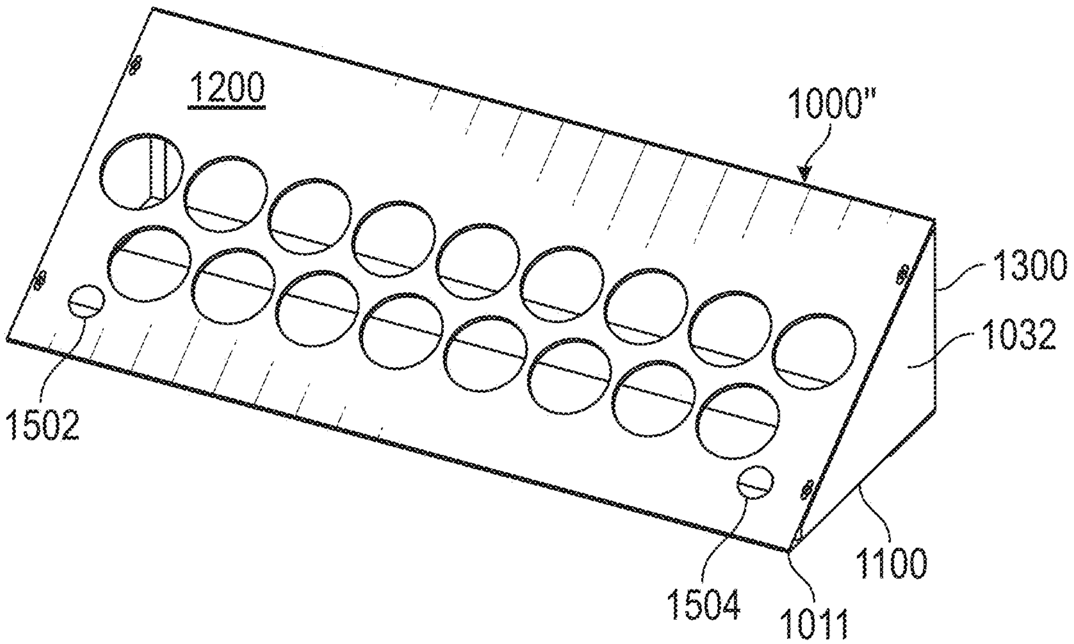
FIG. 5A depicts a rotated isometric front and side view of an alternative bin topper to that depicted in FIGS. 3A-3C, in accordance with an embodiment.
Figure 5B:
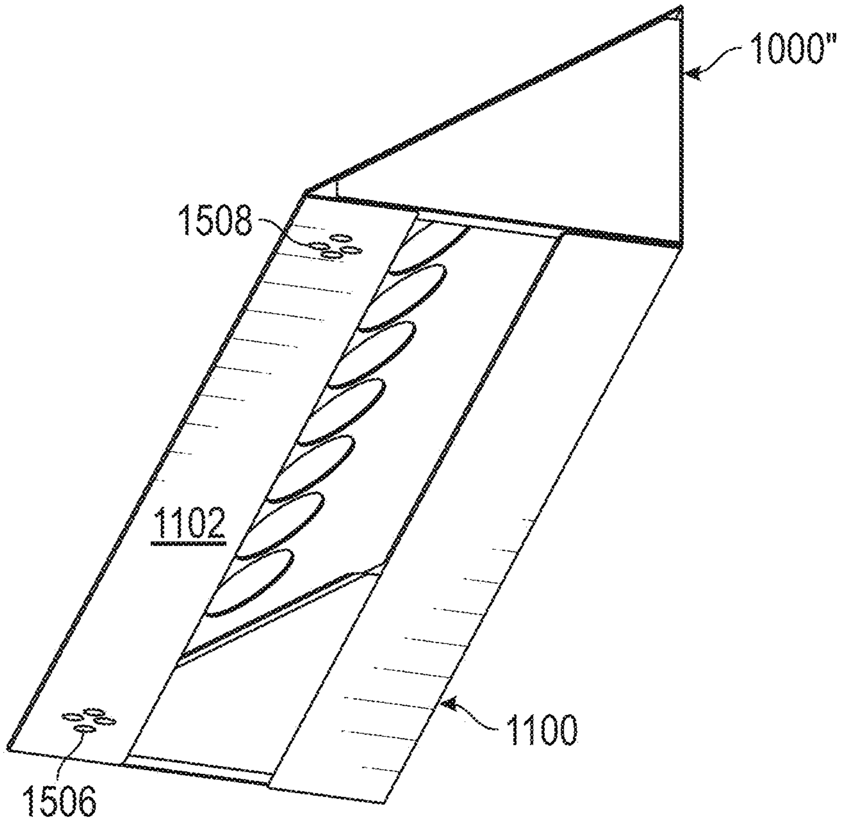
FIG. 5B depicts a rotated isometric bottom and side view of the alternative bin topper of FIG. 5A, in accordance with an embodiment.

Reference is now made to FIGS. 5A and 5B in combination with FIGS. 3A-3C, where FIG. 5A depicts a rotated isometric front and side view of an alternative bin topper (1000") to the bin topper (1000) depicted in FIGS. 3A-3C, and FIG. 5B depicts a rotated isometric bottom and side view of the alternative bin topper (1000") of FIG. 5A, where like elements/features are numbered alike. In an embodiment, bin topper (1000") is identical to bin topper (1000) with the following exceptions. In an embodiment, bin topper (1000") differs from bin topper (1000) by having different features for mounting the bin topper (1000") on the top surface (2010) of the storage parts bin (2000). For example, bin topper (1000") includes at least two openings (1502, 1504) disposed in the front display side (1200) proximate the first bend (1011) (see FIG. 5A for example), and at least two sets of openings (1506, 1508) disposed in the bottom support side (1100), and more particularly in the first flange (1102) (see FIG. 5B for example). As illustrated, each of the at least two sets of openings (1506, 1508) may include a plurality of openings (4 openings for each set of openings 1506, 1508 being illustrated in FIG. 5B). As illustrated, each of the at least two openings (1502, 1504) is disposed in vertical alignment with a respective set of the at least two sets of openings (1506, 1508), such that installation of the bin topper (1000") onto the top surface (2010) of an installed or existing storage parts bin cabinet (2000) may be accomplished by aligning the at least two sets of openings (1506, 1508) with existing ones of the at least two holes (2022, 2024) in the top surface (2010) of the storage parts bin cabinet (2000), and performing a top-down installation procedure of fastener hardware (such as sheet metal screws or the like, for example) through the at least two openings (1502, 1504) and respective sets of the at least two sets of openings (1506, 1508), and into respective ones of the at least two holes (2022, 2024), thereby securing the bin topper (1000") to the storage parts bin cabinet (2000) for enhanced display functionality.

In view of all of the foregoing, and with particular reference to FIGS. 1 and 2 in combination with FIGS. 3A-3E, it will be appreciated that an embodiment disclosed herein includes a combination of a storage parts bin cabinet (2000) and a bin topper (1000), where the combination (herein referred to by reference numerals 2000, 1000) includes a storage parts bin cabinet (2000), an example of which can be found at Applicant's website www.durhammfg.com/product-category/industrial-storage/bins-open/, the content of which is incorporated herein in its entirety by reference, having at least a top surface (2010), and a bin topper (1000) as disclosed herein disposed on and supported by the top surface (2010) of the storage parts bin cabinet (2000). In an embodiment and as disclosed herein, the top surface (2010) of the storage parts bin cabinet (2000) comprises at least two holes (2022, 2024) disposed in one-to-one alignment with corresponding ones of the at least two threaded openings (1302, 1304) of the bottom support side (1100) of the bin topper (1000). In an embodiment, the bin topper (1000) is removably attachable to the storage parts bin cabinet (2000) via the at least two holes (2022, 2024) of the storage parts bin cabinet (2000) and the at least two threaded openings (1302, 1304) of the bottom support side (1100) of the bin topper (1000) via corresponding ones of the threaded fasteners (1306, 1308). In an embodiment, and as disclosed in FIGS. 1-2 and Applicant's website noted herein above, the storage parts bin cabinet (2000) comprises a plurality of individual storage parts bins (2050) arranged in an x-by-y array as viewed from a front elevation view of the combination (2000, 1000).

In an embodiment, the bin topper (1000) is fixedly attached to the top surface (2010) of the storage parts bin cabinet (2000), which may be accomplished via at least one mechanical fastener (1306, 1308), or via at least one metallurgical fastener, such as a weld joint for example (also represented by reference numerals 1306, 1308 as an example).

With consideration to all of the foregoing and as disclosed herein, some embodiments may include some of the following functional advantages: in an embodiment, the bin topper (1000) of FIGS. 3A-3D is configured to enhance the utility of the storage parts bin cabinet (2000) by providing previously underutilized space (on the top surface (2010) of the storage parts bin cabinet (2000) for example) for the secure display of products (3000) such as aerosol cans and the like. In an embodiment, the bin topper (1000') of FIG. 3E is configured to further enhance the utility of the storage parts bin cabinet (2000) by providing, in addition to the functional advantages of bin topper (1000), a label display surface (1400) for product advertising or other product information display.

While certain combinations of individual features have been described and illustrated herein, it will be appreciated that these certain combinations of features are for illustration purposes only and that any combination of any of such individual features may be employed in accordance with an embodiment, whether or not such combination is explicitly illustrated, and consistent with the disclosure herein. Any and all such combinations of features as disclosed herein are contemplated herein, are considered to be within the understanding of one skilled in the art when considering the application as a whole, and are considered to be within the scope of the invention disclosed herein, as long as they fall within the scope of the invention defined by the appended claims, in a manner that would be understood by one skilled in the art.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The use of the terms "top", "bottom", "up", "down", "left", "right", "front", "back", etc., or any reference to orientation, do not denote a limitation of structure, as the structure may be viewed from more than one orientation, but rather denote a relative structural relationship between one or more of the associated features as disclosed herein. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

In view of all of the foregoing, it will be appreciated that various aspects of an embodiment are disclosed herein, which are in accordance with, but not limited to, at least the following aspects and/or combinations of aspects.

The invention claimed is:

1. A bin topper for a storage parts bin cabinet, the bin topper comprising:

a body having a sheet metal construct with at least three contiguously formed sides comprising a bottom support side, a front display side, and a back support side;

wherein the front display side comprises a plurality of openings sized to receive and display one or more products;

wherein an outside footprint of the bottom support side is sized to fit on a same-sized top surface of the storage parts bin cabinet;

wherein a height, H, of the front display side relative to the bottom support side when the body is mounted on the top surface of a storage parts bin is sized such that the one or more products disposed in the plurality of openings of the front display side are supported by either the bottom support side or the top surface of the storage parts bin cabinet, or both the bottom support side of the bin topper and the top surface of the storage parts bin cabinet and extend through a respective one of the plurality of openings; and at least two openings disposed in the front display side, and at least two sets of openings disposed in the bottom support side, wherein each of the at least two openings is disposed in vertical alignment with a respective set of the at least two sets of openings, such that installation of the bin topper onto the top surface of the storage parts bin cabinet is accomplished by aligning the at least two sets of openings with at least two holes in the top surface of the storage parts bin cabinet, and performing a top-down installation procedure of fastener hardware through the at least two openings and respective sets of the at least two sets of openings, and into respective ones of the at least two holes, thereby securing the bin topper to the storage parts bin cabinet for enhanced display functionality.

2. A bin topper of claim 1, wherein the plurality of openings of the front display side comprises at least two rows of openings where the respective openings in each row are in horizontal linear alignment with each other; and the at least two rows of openings comprises a first row of openings, and a second row of openings that are sideways offset from the first row of openings, as viewed from a front elevation view of the bin topper, such that individual openings of the second row of openings are not in vertical alignment with respective individual openings of the first row of openings.

3. The bin topper of claim 1, wherein:

the plurality of openings in the front display side are circular, as observed in a plane of the front display side.

4. The bin topper of claim 1, wherein:

the plurality of openings in the front display side are elliptical and non-circular, as observed in a plane of the front display side.

5. The bin topper of claim 1, wherein the sheet metal construct of the body forms side openings, the bin topper further comprising;

first and second side panels sized, shaped, and non-removably fixedly attached to the body, that substantially close off the side openings.

6. The bin topper of claim 5, wherein:

the first and second side panels are fixedly attached to the body via rivets, welds, or metallurgically bonds.

7. The bin topper of claim 1, wherein:

the plurality of openings in the front display side comprises at least two rows of openings; and the plurality of openings in the front display side are all equally sized with respect to each other.

8. The bin topper of claim 1, wherein:

the body is formed from a roll of sheet metal having a uniform width W that is cut to provide a rectangular piece of sheet metal having a plurality of bends;

the body with the plurality of bends is in the form of a triangle as observed in a side end view of the body;

the bottom support side comprises a first flange and a second flange disposed in a same horizontal plane, with a gap between the first and second flanges;

the front display side is integrally formed with the first flange across a first bend;

the back support side is integrally formed with the front display side across a second bend;

the second flange is integrally formed with the back support side across a third bend;

the front display side is planar.

9. The bin topper of claim 1, further comprising:

a fourth side integrally formed with and disposed between the bottom support side and the front display side.

10. A combination storage parts bin cabinet and bin topper, the combination comprising:

a storage parts bin cabinet having at least a top surface; and a bin topper of claim 1 disposed on and supported by the top surface of the storage parts bin cabinet.

11. The combination of claim 10, wherein:

the storage parts bin cabinet comprises a plurality of individual storage parts bins arranged in an x-by-y array as viewed from a front elevation view of the combination.

* * * * *